US011935378B2

(12) United States Patent
Liiv et al.

(10) Patent No.: US 11,935,378 B2
(45) Date of Patent: Mar. 19, 2024

(54) INTRUSION DETECTION METHODS AND DEVICES

(71) Applicant: DEFENDEC OÜ, Tallinn (EE)

(72) Inventors: Tanel Liiv, Tallinn (EE); Sho Yano, Tallinn (EE); Henri Abel, Tallinn (EE); Tauri Tuubel, Tallinn (EE); Mattis Marjak, Tallinn (EE); Romi Agar, Tallinn (EE); Teet Härm, Tallinn (EE); Ville Arulaane, Tallinn (EE); Indrek Tubalkain, Tallinn (EE)

(73) Assignee: THINNECT OÜ, Tallinn (EE)

( * ) Notice: Subject to any disclaimer, the term of this patent is extended or adjusted under 35 U.S.C. 154(b) by 4 days.

(21) Appl. No.: 17/410,562

(22) Filed: Aug. 24, 2021

(65) Prior Publication Data

US 2021/0383664 A1 Dec. 9, 2021

Related U.S. Application Data

(63) Continuation of application No. 16/757,495, filed as application No. PCT/EP2018/078342 on Oct. 17, 2018, now Pat. No. 11,120,676.

(30) Foreign Application Priority Data

Oct. 20, 2017 (FI) ..................................... 20175933

(51) Int. Cl.

| | |
|---|---|
| ***G08B 13/19*** | (2006.01) |
| ***G08B 13/196*** | (2006.01) |
| ***G08B 25/00*** | (2006.01) |

(52) U.S. Cl.

CPC ....... *G08B 13/19669* (2013.01); *G08B 13/19* (2013.01); *G08B 13/19667* (2013.01);

(Continued)

(58) Field of Classification Search

CPC .............. G08B 13/19669; G08B 13/19; G08B 13/19667; G08B 13/19671; G08B 13/19676; G08B 13/19695; G08B 25/009

See application file for complete search history.

(56) References Cited

U.S. PATENT DOCUMENTS

| | | |
|---|---|---|
| 5,937,092 A | 8/1999 | Wootton et al. |
| 6,628,835 B1 | 9/2003 | Brill |

(Continued)

FOREIGN PATENT DOCUMENTS

| | | |
|---|---|---|
| GB | 2363028 | 12/2001 |
| WO | 2014/076920 | 5/2014 |
| WO | 2016/181150 | 11/2016 |

OTHER PUBLICATIONS

International Search Report for PCT/EP2018/078342 dated Feb. 12, 2019, 4 pages.

(Continued)

*Primary Examiner* — Thai Q Tran
*Assistant Examiner* — Jose M Mesa
(74) *Attorney, Agent, or Firm* — Nixon & Vanderhye PC

(57) ABSTRACT

An autonomous wireless intrusion detector device comprises a movement sensor and a digital camera. In response to detecting a potential movement within a monitored area, the digital camera is triggered to create and store a set of consecutive full-size digital images of the monitored area, and a set of reduced-size thumbnail images corresponding to the set of full-size digital images, and a set of reduced-size thumbnail images corresponding to the set of full-size digital images, for the new alarm event. The detector device sends notification of the new alarm event and reduced-size image-related event information to an intrusion detection network entity, and sends the set of full-size images only if requested by the network entity. The network entity prefilters the new event based on the received reduced-size image-related event information, and request thumbnail images and/or full size digital images from the detector device for a further event analysis only if the prefiltering results in a judgement that the new alarm is a true alarm based on the received reduced-size image-related event information.

18 Claims, 8 Drawing Sheets

(52) U.S. Cl.
CPC . *G08B 13/19671* (2013.01); *G08B 13/19676* (2013.01); *G08B 13/19695* (2013.01); *G08B 25/009* (2013.01)

(56) References Cited

U.S. PATENT DOCUMENTS

| | | | | |
|---|---|---|---|---|
| 6,642,846 | B1 * | 11/2003 | Krubiner .............. | G08B 13/193 340/567 |
| 2004/0080615 | A1 | 4/2004 | Klein | |
| 2012/0122418 | A1 | 5/2012 | Hicks, III | |
| 2013/0215266 | A1 * | 8/2013 | Trundle ................... | H04N 7/18 348/143 |
| 2015/0002665 | A1 | 1/2015 | Sentinelli et al. | |
| 2016/0078316 | A1 | 3/2016 | Sherman | |
| 2020/0250945 | A1 | 8/2020 | Liiv et al. | |

OTHER PUBLICATIONS

Written Opinion of the ISA for PCT/EP2018/078342 dated Feb. 12, 2019, 6 pages.
Search Report for FI20175933 dated May 8, 2018, 2 pages.

* cited by examiner

INTRUSION DETECTION METHODS AND DEVICES

CROSS-REFERENCES TO RELATED APPLICATIONS

This application is a continuation of application Ser. No. 16/757,495 filed Apr. 20, 2020, which is a National Phase of International Application No. PCT/EP2018/078342 filed Oct. 17, 2018, which claims priority to FI Patent Application No. 20175933 filed Oct. 20, 2017, the entire contents of each of which are hereby incorporated by reference.

FIELD OF THE INVENTION

The invention relates to situational awareness systems, such as an intrusion detection systems (IDS) or perimeter intrusion detection systems (PIDS).

BACKGROUND OF THE INVENTION

Wireless sensor networks (WSNs) have many applications, for example in security and surveillance systems, environmental and industrial monitoring, military and biomedical applications. Wireless sensor networks are often used as perimeter intrusion detection systems (PIDS) for monitoring of a territory or infrastructure and the monitoring of its perimeter and detection of any unauthorised access to it. Wireless sensor networks are a low cost technology that provide an intelligence solution to effective continuous monitoring of large, busy and complex landscapes.

A primary consideration in the implementation of the WSNs is the associated power consumption requirements and the limited on-board battery energy. It should be carefully taken into consideration in any algorithm or approach related to sensor network operations. The wireless sensor networks may be used fully autonomously, but typically sensor networks support human decisions by providing data and alarms that have been preliminarily analysed, interpreted and prioritized.

Conventional human intrusion sensing devices and systems may use various known sensor technologies to detect when a secure boundary has been breached. The sensor technologies include passive infrared (PIR) detectors, microwave detectors, seismic detectors, ultrasonic and other human motion detectors and systems. Having detected an intrusion a motion detector generates an alarm signal which may trigger a digital camera in the sensing device. The digital camera may capture still images or record a video as soon as the intrusion occurs. These images or video along with the location of the intrusion may be sent wirelessly to control centre station.

Sensor triggered digital cameras set up in nature take photos within a very visually volatile environment. Trees sway in the wind, bushes and branches oscillate, lighting changes due to clouds and the sun. Henceforth all these will be collectively called "natural changes". All other changes, e.g. people, animals, cars, will be called "actors". Digital cameras take photos when the sensor is triggered for any reason. Triggers by natural phenomenon are called false-alarms. The reason for some of these false alarms is that, to the detection system, the event 'looks' like a real attack so that the source of the non-human motion is falsely detected and reported as a human intruder. In a surveillance type of system it is imperative that the operator of the system is not overloaded by false-alarm when the environment starts triggering the sensor. If there are large numbers of false alarms then extra work will be created in assessing the alarms and responding accordingly. This can rapidly lead to loss of operator confidence in the intrusion detection system and consequently, a true alarm may be missed or ignored. The processing of the false alarms and sending digital images of false alarms to the operator of the system also consumes the battery energy of the sensor. The created photos contain a lot of information, but are easily readable only by humans. It is a very hard non-deterministic problem for machines to understand images correctly with high accuracy. This is especially difficult task for digital camera still images or low frame-rate video which might have a trigger time difference from seconds to hours, so almost every part of the image is somewhat changed and following gradual changes might be very complicated. There is a need to effectively differentiate between alarms and false-alarms in order to reduce and mitigate various disadvantages caused by false alarms.

BRIEF DESCRIPTION OF THE INVENTION

An aspect of the present invention is to reduce amount of false-alarms and mitigate disadvantages caused by false alarms. The aspect of the invention can be achieved by intrusion detection methods, an intrusion detection device and an intrusion detection network entity disclosed in the independent claims. The preferred embodiments of the invention are disclosed in the dependent claims.

An aspect of the invention is an intrusion detection method in an autonomous wireless detector device having at least one motion sensor and at least one digital camera, comprising

- triggering a new alarm event in response to the motion sensor detecting a potential movement within a monitored area,
- triggering the digital camera to create a set of consecutive full-size digital images of the monitored area for the new alarm event,
- creating a set of reduced-size thumbnail images corresponding to the set of full-size digital images for the new alarm event,
- storing the set of full-size digital images and the set of thumbnail images of the new alarm event in the wireless sensor device,
- sending notification of the new alarm event and reduced-size image-related event information to an intrusion detection network entity, and
- sending the set of full-size images to the intrusion detection network entity only if requested by the intrusion detection network entity upon sending the reduced-size image-related event information.

In an embodiment, the reduced-size image-related event information includes one or more of: the set of reduced-size thumbnail images; image-descriptive information, preferably hashes, computed based on the set of thumbnail images or the set of full-size digital images; and said event information optionally includes one or more of: motion sensor data, date, time and geographical position.

In an embodiment, the method further comprises sending the set of thumbnail images to the intrusion detection network entity only if requested by the intrusion detection network entity after sending the notification of the new alarm event and the reduced-size image-related event information.

In an embodiment, the method comprises creating sub-sampled change-sensitive hashes from the set of thumbnail images and/or the set of full-size images of the new event, and sending the created hashes to the intrusion detection network entity in the reduced-size image-related event information, preferably together with the notification of the new alarm event.

In an embodiment, the method comprises sending the set of full-size images to the intrusion detection network entity only if requested by the intrusion detection network entity after sending the set of thumbnail images.

In an embodiment, the method comprises performing a robust false alarm test for the new alarm event, sending the notification of the new alarm event and the reduced-size image-related event information to the intrusion detection network entity, if the new alarm event is a true alarm according to the false alarm test, and ending the new alarm event as a false alarm otherwise.

In an embodiment, the false alarm test comprises analysing similarity of at least one thumbnail image or full-size image of the new alarm event with at least one previous thumbnail image or full-size image of the new alarm event or a previous alarm event, ending the new alarm event as a false alarm, if the images are similar or almost similar, and sending the notification of the new alarm event and the reduced-size image-related event information to the intrusion detection network entity, if the images are not almost similar.

In an embodiment, the false alarm test comprises creating subsampled change-sensitive hashes from at least one thumbnail image or full-size image of the new alarm event and from at least one previous thumbnail image or full-size image of the new alarm event or a previous alarm event, calculating aggregated Hamming or Euclidean or corresponding distances over hashes for all subsampled change-sensitive hashes, if the aggregated distances indicates any spot of any high-variation difference between the at least one new thumbnail or full-size image and the at least previous thumbnail or full-size image, setting the new alarm as a true alarm, and setting the new alarm as a false alarm otherwise.

In an embodiment, the method comprises reconfiguring a detection sensitivity of the intrusion detector device according to sensitivity parameters received from the intrusion detector network entity.

Another aspect of the invention is an intrusion detection method in an intrusion detector network entity, comprising receiving from an autonomous intrusion detector device a notification of a new event and reduced-size image-related event information, said detector device operating according to a method as claimed in any one of claims 1 to 8, prefiltering the new event based on the received reduced-size image-related event information, ending a processing of the new event if the prefiltering results in a judgement that the new alarm is a false alarm based on the received reduced-size image-related event information, and continuing the processing of the new event if the prefiltering results in a judgement that the new alarm is a true alarm based on the received reduced-size image-related event information, said continuing including requesting reduced-size thumbnail images and/or full size digital images from the intrusion detector device for a further event analysis.

In an embodiment, the received reduced-size image-related information comprises subsampled change-sensitive hashes created by the intrusion detector device from at least one thumbnail image or full-size image of the new alarm event and from at least one previous thumbnail image or full-size image of the new alarm event or a previous alarm event, and the prefiltering comprises retrieving hashes of at least one previous event of the same intrusion detector device from a database of the intrusion detector network entity, calculating Hamming or Euclidean or corresponding distances between possible pairs of hashes of the new event and hashes of the at least one previous event, aggregating the calculated distances of the hash pairs, checking whether each of the received hashes of the new event has a partner hash among the hashes of the at least one previous alarm event with which some measured aggregated score meets a predetermined criterion, if each of the received hashes meets the predetermined criterion, the prefiltering results in a judgement that the new alarm is false alarm, and the prefiltering resulting in a judgement that the new alarm is true alarm otherwise, and the continuing of the processing comprising requesting reduced-size thumbnail images and/or full size digital images from the intrusion detector device.

In an embodiment, the received reduced-size image-related information comprises one or more reduced-size thumbnail images of the new event, and the prefiltering comprises calculating structural similarity indexes over a set of thumbnail images subdivided into a number of subblocks of a preset grid size, if the similarity index of an individual subblock meets a predetermined criterion or similarity indexes of a set of subblocks depicting a pattern of a preset size or shape meet a predetermined criterion, a movement of an object is detected and the prefiltering results in a judgement that the new event is true event, and otherwise the prefiltering results in a judgement that the new event is false event.

In an embodiment, the continuation of the processing of the new event comprises requesting the full-size images only after the processing or prefiltering of the reduced-size thumbnail images results in a judgement that the new event is true alarm.

In an embodiment, the continuation of the processing of the new event comprises determining a class of an object detected in the images, a speed of movement of the object, and/or a direction of movement of the object.

In an embodiment, the method comprises providing to an end user through a user interface one or more of: a notification of receiving the new alarm event; notification of a false alarm; notification of a true alarm; one or more thumbnail images or full-size images of the new alarm event; class of an object detected; speed of movement; direction of movement.

In an embodiment, the method comprises controlling a detection sensitivity of the intrusion detector device less sensitive or more sensitive based on the false-true classification of the received alarm events.

A further aspect of the invention is an autonomous intrusion detector device, comprising at least one motion sensor for movement detection, a wireless communications interface unit, data processing unit, an autonomous power source and at least one digital camera, the autonomous intrusion detector device being configured to implement the intrusion detector method.

A still further aspect of the invention is an intrusion detector network entity, comprising a data processing unit and an associated user interface, the entity being configured for implementing the intrusion detecting method.

BRIEF DESCRIPTION OF THE DRAWINGS

In the following the invention will be described in greater detail by means of exemplary embodiments with reference to the accompanying drawings, in which.

DESCRIPTION OF EXEMPLARY EMBODIMENTS

Figure 1:
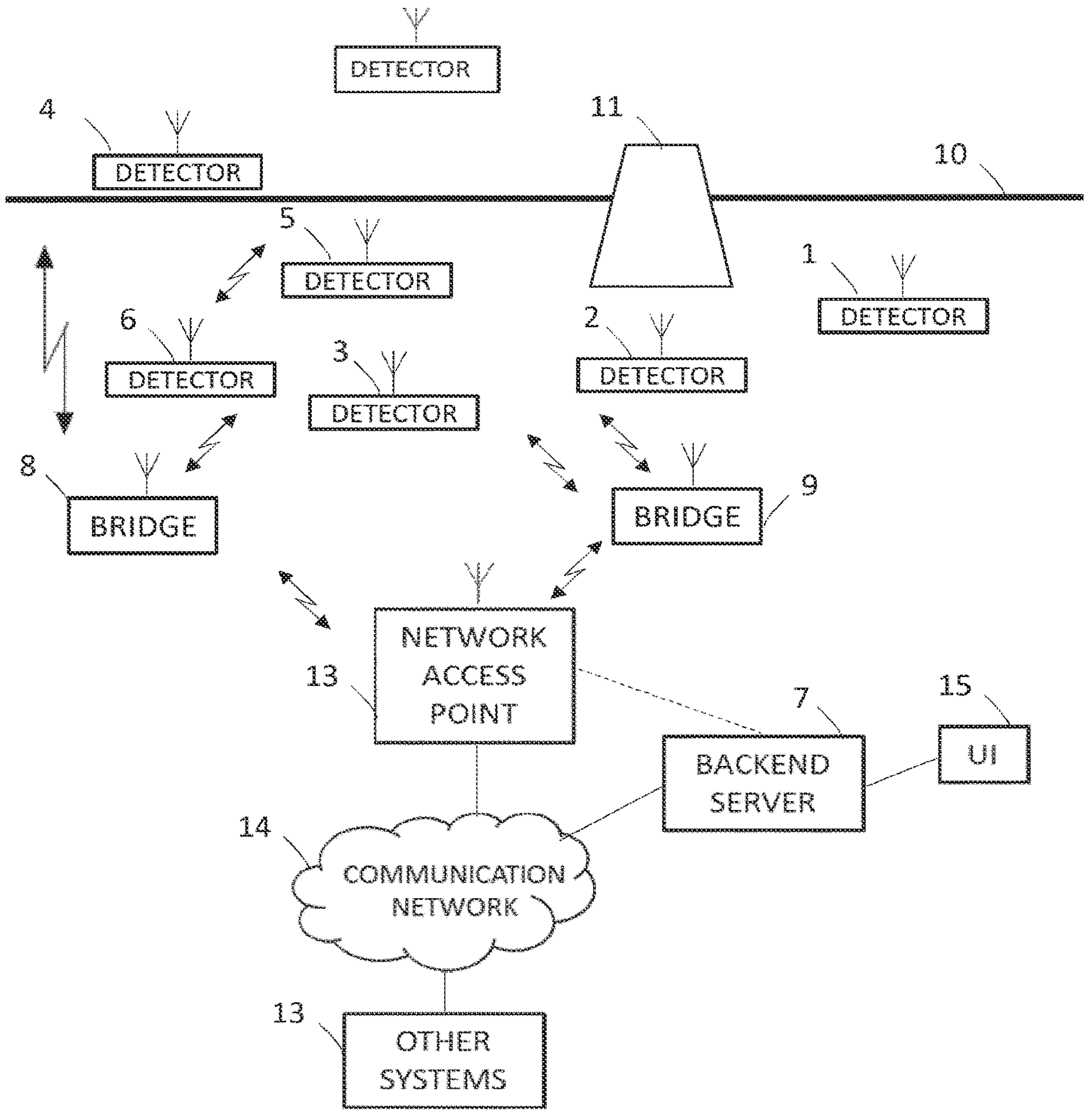
FIG. 1 shows a simplified schematic block diagram illustrating an exemplary autonomous situational awareness system, such as an intrusion detection system (IDS)

A simplified schematic block diagram of an exemplary autonomous situational awareness system, such as an intrusion detection system (IDS) according to an embodiment is illustrated in FIG. 1. The system may comprise plurality of wireless sensor nodes or stations 1, 2, 3, 4, 5 and 6 (any number of sensor stations may be employed), which are also called wireless detector devices herein, optionally one or more bridges 8 and 9, and a back-end server or central network entity 7.

A plurality of wireless detector devices 1-6 may be placed in close proximity and around the monitored asset, object, area or perimeter 10 (in various places or following a certain installation pattern). Detector devices may be placed in selected locations manually or from vehicles, including deployment from aerial and water vehicles. The detector devices 1-6 may be configured to form a network of detector devices, and to exchange configuration information about the network and measurement information on the monitored environment acquired by detector devices. According to an embodiment, the detector devices 1-6 may be configured (programmed) to organize themselves into a wireless network of detector devices, such as an ad hoc network, that employs decentralized control, meaning that there may not be any requirement for a central control centre. An "ad hoc network" is a collection of wireless detector devices that can dynamically be set up anywhere and anytime without using any pre-existing network infrastructure. A structure of an ad hoc network is not fixed but can change dynamically, i.e. detector devices (nodes) 1-6 can be added to or removed from the ad hoc network while the ad hoc network is operational, without causing irreversible failures. Thus, an ad hoc network is able to reconfigure the flow of network traffic according to the current situation. A network of detector devices may use multi-hop networking wherein two or more wireless hops can be used to convey information from a detector device to an access network, and vice versa. In other words, a detector device may have a first wireless hop to a neighbouring detector device that may have a second wireless hop to a wireless bridge or to an access network.

Figure 2:
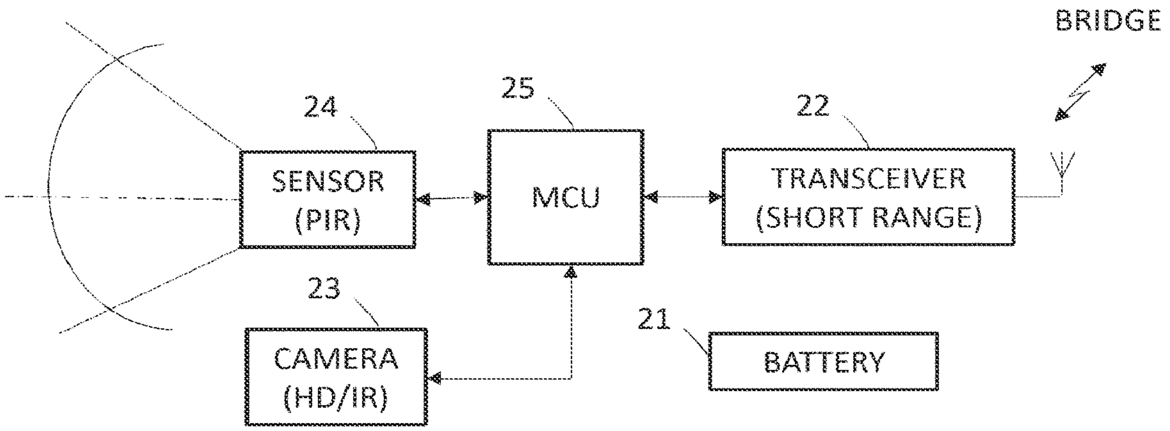
FIG. 2 shows a simplified schematic block diagram of an exemplary detector device.

A wireless detector device may be an autonomous sensing device comprising at least one sensor for movement detection, and a wireless (preferably radio) communications interface unit, data processing capability, an autonomous power source and at least one digital camera. A simplified schematic diagram of an exemplary wireless detector device is illustrated in FIG. 2. A detector device 1 may be provided with a wireless communication interface 22, e.g. radio part with a transmitter, a receiver, and an antenna, a data processing unit 23, and an autonomous power supply 21, such as a battery. According to another exemplary embodiment, the autonomous power supply 21 may also be equipped with an energy harvesting device that enables collecting energy from the environment, for example a solar panel. For a movement detection the detector device 1 may comprise one or more sensors 24 for registering or measuring physical parameters related to movement (such as sound, light, seismic, vibration, magnetic field, infrared) and/or detecting changes in the environment (such as humidity, temperature, etc.). In an embodiment, the detector device may be equipped with at least one passive infrared sensor (PIR) for the movement detection. In an embodiment, the detector device may be equipped with at least one digital camera unit 23 for visual surveillance of the monitored asset, object, area or perimeter 10. The at least one digital camera unit 23 may include at least one day-time and/or at least one night-vision digital camera, for example a digital camera having an infrared capability to operate at night. In embodiments, a detector device 1 may be equipped with a high resolution digital camera for day-time surveillance and an infrared digital camera for night time security. The data processing unit 25 may comprise a microcontroller unit MCU which may include a processor part and a memory part as well as peripheral entities. The detector device 1 may also be equipped with a positioning hardware (for example a GPS receiver) providing location information (such as geographical coordinates). The wireless (preferably radio) communications interface unit 22 may be configured for a two-way wireless communication between wireless detector devices 1-6, between a wireless detector device 1-6 and a wireless bridge 8-9, and/or between a wireless detector device 1-6 and a wireless network access point 13. The wireless communications interface unit 22 may be equipped with a radio part with a transceiver (a transmitter and a receiver) and an antenna. In exemplary embodiments, a radio interface between detector devices 1-6 and a bridge 8-9 may be configured for a short range radio communication, while a radio interface between the bridge 8-9 and a wireless access network 13 may be configured for a long range radio communication.

Wireless interfaces employed may be based on any radio interfaces, such as a radio technology and protocols used in wireless local area networks (WLANs) or wireless personal area networks, such as IEEE 802.11 (WiFi), IEEE 802.15.1 (Bluetooth), IEEE 802.15.4 (ZigBee) technology, or in mobile communication systems, such as GSM and related "2G" and "2.5G" standards, including GPRS and EDGE; UMTS and related "3G" standards, including HSPA; LTE and related "4G" standards, including LTE Advanced and LTE Advanced Pro; Next generation and related "5G" standards; IS-95 (CDMA), commonly known as CDMA2000; TETRA, etc. In exemplary embodiments, a short range radio interface may be based on IEEE 802.15.4 (ZigBee) technology and a long range radio interface may be based on 3G or CDMA mobile communication technology.

Figure 3:
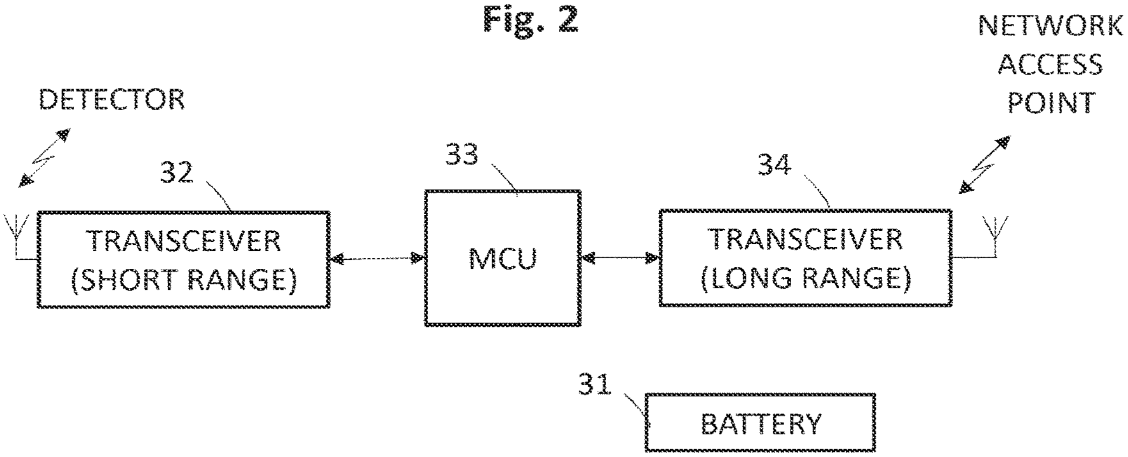
FIG. 3 shows a simplified schematic block diagram of an exemplary wireless bridge.

A wireless bridge 8 or 9 may be an autonomous wireless communication device equipped to communicate with the wireless detector devices 1-6 and a wireless access network, more specifically with a network access point 13 in the access network. A primary function of a wireless bridge 8-9 may forward alarm data and messages between wireless detector devices 1-6 and a wireless access network, and the back-end server or network entity 7. In embodiments, at least one bridge may communicate wirelessly directly with the back-end server or network entity 7, i.e. not via a wireless access network. There may be any number of wireless bridges. Multi-hop networking enables greater flexibility of installation patterns of wireless detector devices per a single wireless bridge. In the example illustrated in FIG. 1, the wireless bridge 9 is configured to have separate wireless one-hop connections to detector devices 1, 2 and 3, and a wireless one-hop connection to the network access point 13. The bridge 8 is configured to have separate wireless one-hop connections to the detectors 4 and 6, and a wireless multi-hop connection to the detector 5 via the detector 6, and a wireless one-hop connection to the network access point 13. A simplified schematic block diagram of an exemplary wireless bridge is illustrated in FIG. 3. A wireless bridge may be provided with a wireless communication interface 32, e.g. radio part with a transmitter, a receiver, and an antenna, a data processing unit 33, such as a microcontroller unit MCU (which may include a processor part and a memory part as well as peripheral entities), a further wireless communication interface 34, and an autonomous power supply 31, such as a battery. A first wireless (preferably radio) communications interface unit 32 may be a short range wireless transceiver unit configured for a two-way wireless communication between wireless detector devices and the wireless bridge. A second wireless (preferably radio) communications interface unit 34 may be a long range wireless transceiver unit configured for a two-way long-range wireless communication between the wireless bridge and a wireless network access point.

A back-end server or central network entity 7 may collect and store information from the wireless bridges 8-9 and the wireless detectors 1-6, and optionally from other sources, such as seismic sensors. The back-end server may be implemented by a server software stored and executed in suitable server computer hardware. A back-end server or central network entity 7 may be provided with a user interface (UI) 15, for example a graphical user interface, for alarm management and data analytics. For example, visual alarm information may be displayed either as an alarm flow or on geographical map. The user interface (UI) 15 may be a local UI at the location of the back-end server or network entity, or a remote UI communicatively connected to the back-end server or network entity. For example, the back-end server or network entity 7 may be implemented in a workstation or laptop computer, and the UI 15 comprises a monitor or display of the workstation or laptop. As another example, the back-end server or network entity 7 may be provided with an UI 15 in form of a web UI server which can be accessed by a web browser. The back-end server or network entity may also be equipped with a database, memory hardware or any type of digital data storage. The back-end server or network entity may further comprise various components for processing alarm events, analysing alarm events, detecting actors, classifying alarm events, filtering alarm events, and/or removing false alarms. In exemplary embodiments such components may include one or more of an Actor Detector component, a Prefilter component, and a Detector Sensitivity Configurator component whose functionality will be described in more detail below.

Figure 4:
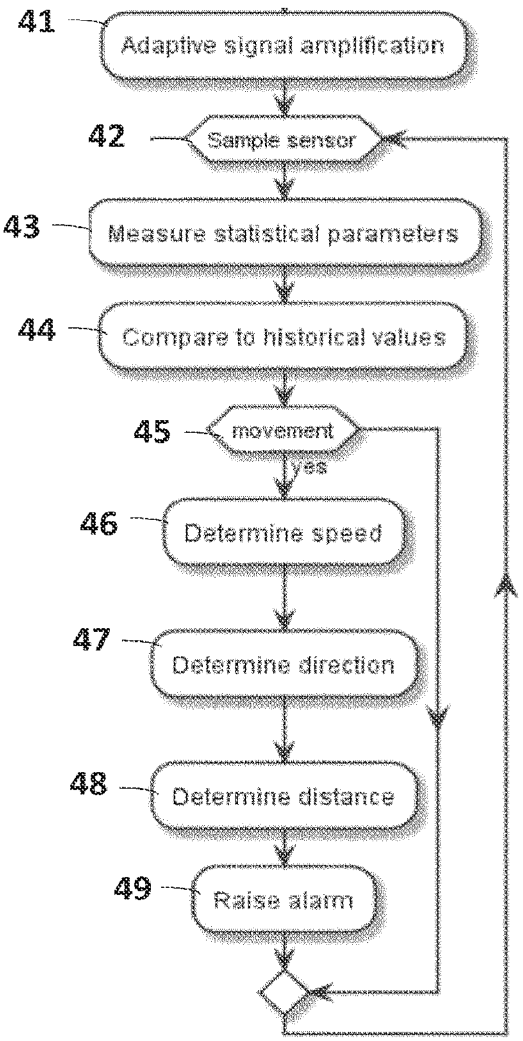
FIG. 4 shows a simplified flow diagram illustrating an example of processing of a sensor-triggered event in a detector device.

Returning now to a detector device 1, the processing unit MCU 25 may be configured (programmed) to monitor the outside physical world by acquiring samples the sensor(s) 24. The sensor 24 may trigger an event when an appropriate object is in its monitoring area. False triggers happen due to natural phenomena and low processing power. An exemplary flow diagram of processing of a sensor-triggered event in a detector device 1 illustrated schematically in FIG. 4. In exemplary embodiments, a passive infrared sensor (PIR) may be used for human detection. Humans emit some amount of infrared radiation which is absorbed by the PIR sensor 24 to identify the human intrusion. The PIR sensor may be equipped with optics so that multiple detection zones may be arranged for each PIR sensor 24. The detector device 1 may also be equipped with an analog part that interfaces with the PIR sensor(s) and amplifies the PIR sensor signal according to environmental conditions. The analog part may comprise a separate analog path with configurable or adaptive signal amplification for each PIR sensor 24 (step 41 in FIG. 4). The PIR sensor signal may be sampled by the MCU 25 in regular intervals (step 42). Information about date and/or time may be added to every piece of information. The MCU may be configured (programmed) to provide a digital front-end module, i.e. signal analysis and movement detection software. All the different PIR signals may be fed into the front-end module that may determine whether the PIR signal represents a movement or not. The determination may include measurement of one or more statistical parameters of the PIR signal (step 43) and comparing the measured parameter to current or historical parameter values (step 44), and deciding (step 45) that the PIR signal represents a movement if the comparison meets a predetermined criterion. If the PIR signal does not represent a movement (result "NO" from step 45), the front-end module may proceed to continue sampling in step 42. If the PIR signal represents a movement (result "YES" from step 45), the front end module may optionally further try to determine one or more of a speed of the movement (step 46), a direction of the movement (step 47) and a distance of the object from the detector device 1 (step 48) before raising an alarm, called a device event herein, and/or triggering an event in the digital camera 23 (step 49).

In an embodiment, also a sample of raw sensor data or readings for a configurable time window prior to the trigger time may be stored locally in a memory of the detector device 1. In an embodiment, the raw sensor data or readings may be stored into a buffer memory of a preconfigured size. In an embodiment the raw sensor data or readings may be stored in a ring buffer of a preconfigured size. In an embodiment, stored raw data contents may also be associated with rolling-statistics for the raw samples included, such as rolling averages and/or floors over time. The stored raw data contents, and optionally the associated data, may be sent to the server along with an event notification or alarm.

Figure 5:
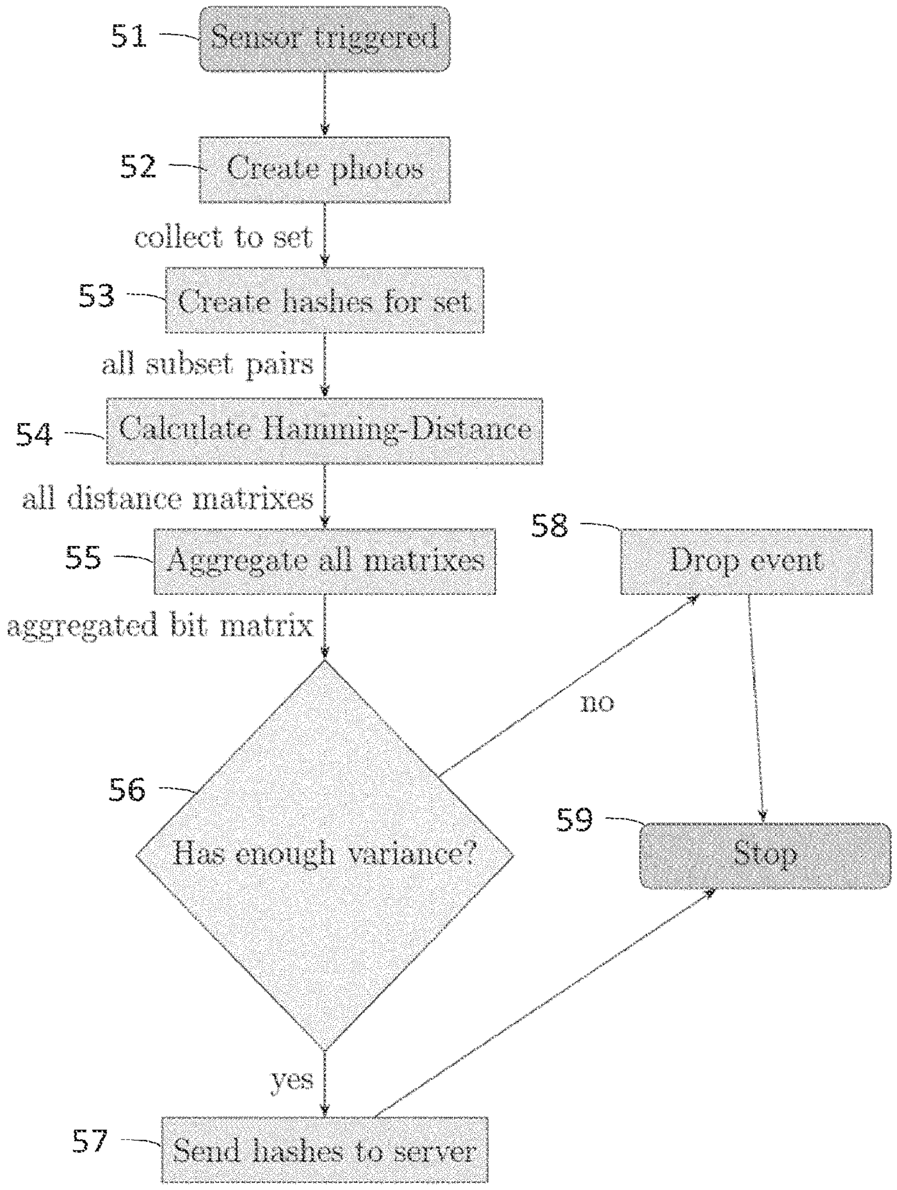
FIG. 5 shows a simplified flow diagram illustrating an example of processing of a sensor-triggered camera event in a detector device.

FIG. 5 shows a simplified flow diagram illustrating an example of processing of a triggered camera event in a detector device 1. In embodiments, an event in the digital camera(s) 23 may be triggered by a movement detection or alarm made based on the sensor signal(s) (step 51 in FIG. 5). The triggering sensor(s) 24 may be any suitable type of sensor or combination of different types of sensors, such as a PIR sensor, a seismic sensor, a magnetic sensor etc. In an embodiment, the digital camera 23 may be triggered based on an alarm or triggering signal provided according to sensor detection embodiments described above with reference to FIG. 3. The triggered digital camera 23 may take or create one photographic image or two or more consecutive photographic images of the monitored asset, object, area or perimeter 10 (step 52). A single image option is possible but in that case every analysis module will compare it to previous trigger event images, which will cause more false-alarms due to the fact that the differences between the compared images are much greater to the possibly much larger time difference between creation times of the images. In embodiments, the digital camera 23 may create a configurable or predetermined number of images of the area in front of the digital camera in succession over a configurable or predetermined amount of time. All images the digital camera creates may have both a thumbnail image and a full resolution image available. Information about date and/or time and/or geographical position may be added to all images. A full resolution image refers to a full-size image or video frame with a normal or original resolution. A thumbnail image is a reduced-size or reduced resolution version of a full-size image or video frame. The collected set of created images may be stored in a local memory in the detector device 1.

According to an aspect of the invention, a wireless detector device 1 may send an alarm notification to the back-end network entity or server 7 after every triggered camera event, without attempting to detect false alarms. In an embodiment, the alarm notification may be sent with one or more thumbnail images of the triggered event, and optionally raw sensor data samples stored in a buffer memory, to the back-end network entity or server 7 for further processing and false alarm filtering. The back-end network entity or server 7 may request further thumbnail images or full images, if it has determined that the triggered event is a true alarm based on the already sent thumbnail image(s). Sending thumbnail images first may reduce the amount of data transferred and thereby may conserve the battery 21 of the detector device 1.

According to another aspect of the invention, a wireless detector device 1 may be configured to first perform a false alarm test for a triggered camera event, and to send an alarm notification to the back-end network entity or server 7 if the triggered camera event passes the false alarm test. In embodiments, a wireless detector device 1 may be configured to subject the triggered camera events to a strict and robust test to detect the easiest cases of false alarms. This may primarily mean that only cases where almost nothing moved or changed in the images will be classified as false alarms. Such a strict and robust test will require less processing power but will in any case reduce the number of false alarms sent to the back-end network entity or server 7, which both may conserve the battery 21 of the detector device 1. An alarm notification sent to the to the back-end network entity or server 7 may include information created during the false alarm test, and/or one or more thumbnail images, and optionally raw sensor data samples stored in a buffer memory.

As described above, the MCU may be configured (programmed) to provide a digital front-end module, i.e. signal analysis and movement detection software. In embodiments, the front end module may create structural similarity indexes over a set of thumbnail images or full-size images subdivided into a number of subblocks of a preset size. In embodiments, the front-end module may create a sub-sampled change-sensitive hash from the image by means of a suitable hashing function or algorithm (step 53). A sub-sampled hash may describe the image only robustly. A suitable hash function may be a function that will create a similar (or even identical) hash for similar images from various features of the image content. In an exemplary embodiment a perceptual hashing function may be used. Other examples of suitable hash functions include an average hash, a difference hash, and a wavelength hash. The created hash may be represented as a 2-dimensional matrix where every matrix cell may represent and robustly describe a corresponding sub block or sub-image in the original image. More specifically, each cell in the hash matrix may represent a measured value of at least one descriptive property of the respective subblock in the original image. Examples of such descriptive properties include luminance, color, and texture. The created hashes of the collected set of created images may be stored locally in a memory of the detector device 1.

The front-end may then subject the created hashes to a strict and robust test to detect the easiest cases of false alarms. In an embodiment, the robust test to detect false alarms may comprise taking (computing) Hamming or Euclidean Distances (or similar) over hashes for all subset pairs of images in the current collected set of images (step 54). This may comprise computing Hamming or Euclidean Distance of every point or cell in the current hash to all provided previous hashes in the collected set of images, aggregating Hamming or Euclidean Distances of the same point or cell in the current hash into a two-dimensional distance matrix for the current image, and aggregating Hamming or Euclidean Distance matrix into an aggregated distance matrix in a way that enables to find high-variation hotspots in the distance matrix (step 55).

The test may further comprise checking if any of the aggregated distance matrixes contains a relatively large continuous area of change (step 56). If a sufficient variance is determined in any of the aggregated distance maps of the subset pairs of images (result "YES" from step 56), the MCU 25 may send an alarm notification with the hashes, and optionally raw sensor data samples stored in a buffer memory, to the server 7 for further processing, and the processing of the triggered camera event at the detector device ends (steps 57 and 59). If the distance maps are relatively stable and do not contain any difference hotspots (result "NO" from step 56), then the alarm may be dismissed or dropped (step 58) and the processing of the triggered camera event at the detector device ends without no further action (step 59).

Figure 6:
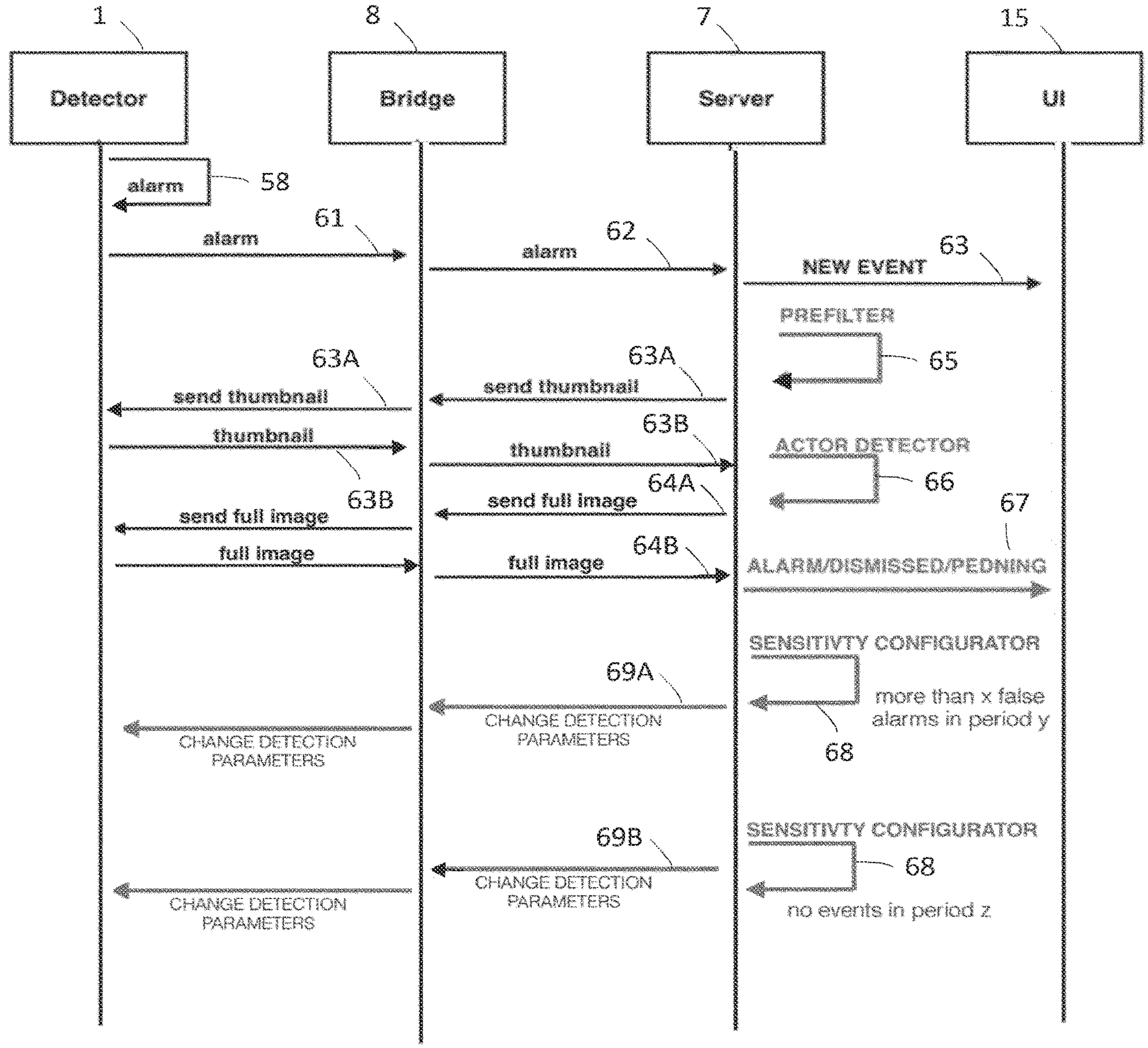
FIG. 6 shows a simplified schematic signalling diagram that illustrates an exemplary signalling and processing of an alarm.

FIG. 6 shows a simplified schematic signalling diagram that illustrates an exemplary signalling and processing of an alarm. Let us first assume that a movement is detected in a wireless detector device 1 and an alarm notification 61 is sent. There may a false alarm test before sending the alarm notification, for example as explained regarding step 58 in FIG. 5. The alarm notification 61 may be relayed to the back-end network entity or server 7 by the wireless bridge 8. The back-end server 7 may receive the alarm notification including information about the event, such as the image hashes and optionally raw sensor data samples. Upon receiving the alarm notification the back-end server may notify a user about the new event through a user interface (UI) 15 (step 62).

The back-end network entity or server 7 may perform a prefiltering of the current event by performing a false alarm analysis for event information, such as hashes and/or thumbnail images and optionally the raw sensor data samples, received in the current event and in at least one previous event to determine a resolution. The prefiltering analysis is generally illustrated as a Prefilter 65 in FIG. 6. The prefiltering 65 at the back-end server 7 may classify the current event as a false alarm or a true alarm based on the analysis. The robust and early prefiltering 65 enables to save on energy, radio bandwidth and processing power of the wireless detector device 1, because the detector device will not send full images or images at all for some false-alarm cases. The further more detailed analysis for the pre-filtered event is generally illustrated as an Actor Detector 66 in FIG. 6. If the current event is classified as a true alarm in the prefiltering 65, the back-end server 7 may request one or more images in thumbnail and/or full resolution formats for more detailed analysis. In the example illustrated in FIG. 6, the back-end server 7 may first send a request to send thumbnails 63A to the wireless detector device 1, and the wireless detector device 1 may reply by sending one or more thumbnails 63B to the back-end server 7. Then, if required, back-end server 7 may send a request to send full images 64A to the wireless detector device 1, and the wireless detector device 1 may reply by sending one or more full images 64B to the back-end server 7. A resolution reached by the actor detector 66 may be notified 67 to an end user through the user interface (UI) 15. For example, the end user may be notified that the alarm related to the new event 62 is dismissed (false alarm), still pending (further analysis needed) or a true alarm. The notification 67 may include at least one image relating to the alarm, and optionally more detailed information of the detected event, such as a location, size, speed, movement direction and/or class of an object or objects in the image. In embodiments, a resolution result may further be used to configure wireless detector devices for better detection in following triggers, as illustrated generally by a Sensitivity Configurator 68 in FIG. 6. Examples of the prefiltering 65, the actor detection 66, and the sensitivity configuration 68 will be given below.

Figure 7:
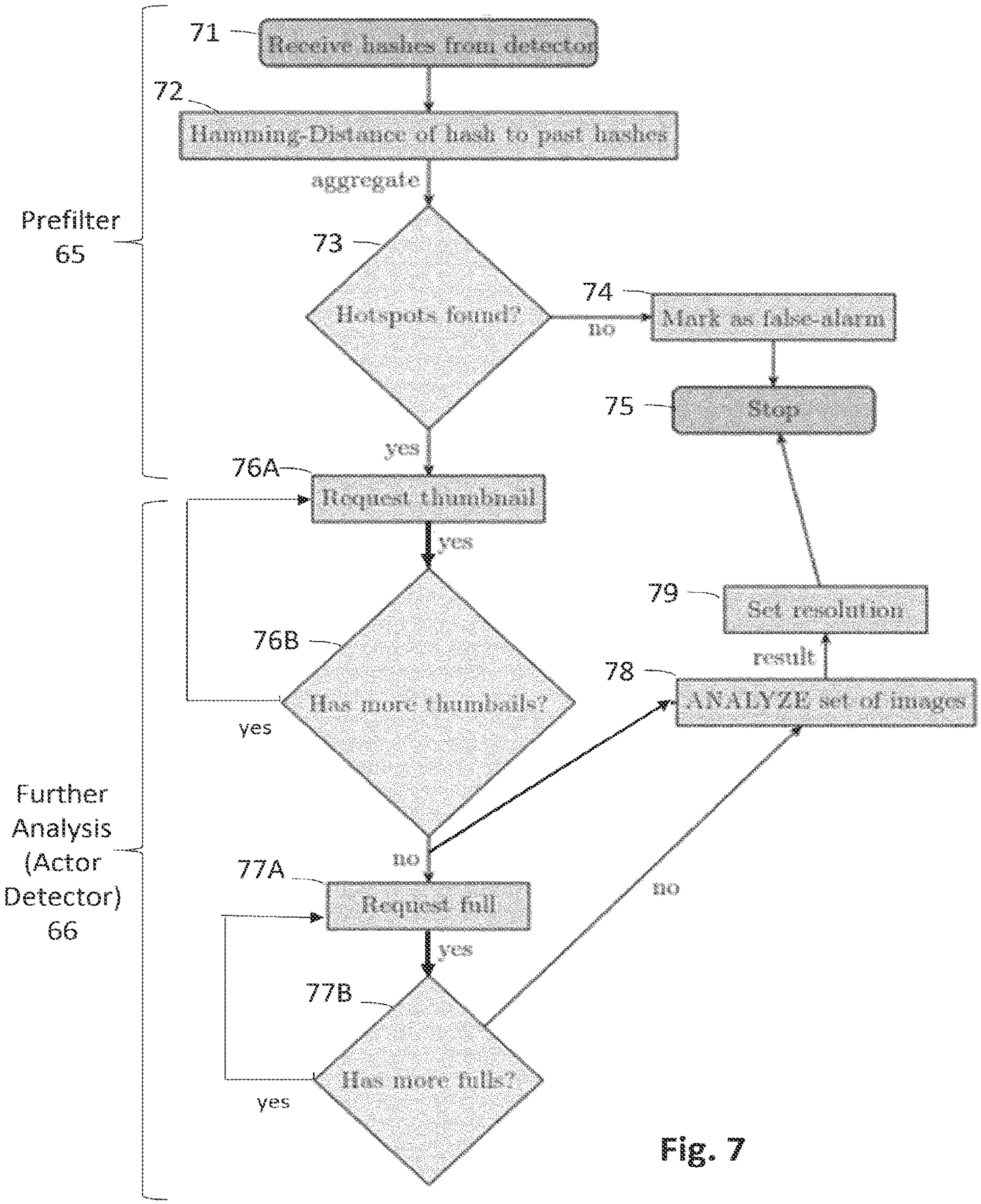
FIG. 7 shows a flow diagram illustrating schematically a prefilter process based on a hash analysis and a further analysis of a true alarm according to exemplary embodiments.

FIG. 7 shows a flow diagram illustrating schematically a prefilter process 65 based on a hash analysis according an exemplary embodiment, as well as a further analysis or Actor detection 66 of a true alarm according to an exemplary embodiment. An alarm notification 61 with a set of hashes is received from a wireless detector 1 (step 71). The process may then look up hashes of previous events from the same detector device 1 which are locally stored in the back-end network entity or server. If sequentially previous events are relatively old, lighting or other visual condition changes at the surroundings of the detector device 1 may account for a large part of change between the images and hashes of the previous and current events. Therefore, in an embodiment, instead of choosing the next previous event in succession, the prefilter process may optionally choose an event from an earlier time that likely had similar lightning or other visual conditions, e.g. an event from the previous day at roughly the same time. In an embodiment, the prefilter process may optionally or additionally use robust difference metrics to find and choose the events with the most subjectively visually similar images from the database of past events in the back-end server. Then the prefilter process may load the hashes of the chosen previous set of events and calculate Hamming/Euclidean distances between all possible pairs of hashes of the current event and hashes of all chosen previous sets of events (step 72). In an embodiment, Hamming/Euclidean distances may be calculated for all hash pairs in the exact same coordinates or immediate vicinity. In an embodiment, Hamming or Euclidean Distances of the hash pairs may be aggregated in a way that enables to find high-variation hotspots in a distance matrix. Then the prefilter process may check whether there are high-variation hotspots among the aggregated Hamming or Euclidean distances of the hash pair (step 73). For example, in an embodiment, the prefilter process may check whether all hashes from the newest received set of hashes have a partner hash from a previous set of hashes with which some measured aggregated score meets a predetermined criterion, e.g. the aggregated score is below a threshold, it may be determined that no high-variation hotspot is found, and otherwise it is determined that a high-variation hotspot is found. If no hotspot is found (result "NO" from step 73), then the current event may be marked as a false-alarm (step 74) and the prefilter process may stop (step 75). If at least one hotspot is found (result "YES" from step 73), the current event may be determined to be a true-alarm. In case of a true-alarm, the prefilter process may request thumbnails and full images of the current event from the detector device 1 for further processing by other modules. This robust/early analysis enables to save on energy, bandwidth and processing power of the digital camera by not sending images at all for some false-alarm cases.

In the exemplary embodiment illustrated in FIG. 7, the true-alarm from step 73 in Prefilter 65 may be subjected to more detailed analysis, or an Actor detection 66. In the illustrated example, a set of thumbnails may be first requested from the detector device 1 in steps 76A and 76B, and then a set of full images may be requested from the detector device 1 in steps 77A and 77B. In an embodiment, both thumbnails and full images may be subjected to the same analysis 78 for resolution 79. The set of thumbnails may be analysed first and then the set of full images. In the exemplary embodiment illustrated in FIG. 7, the set of thumbnails received in steps 76B may be analysed first in step 78, and the full set of full images received in step 77B may be analysed later in step 78. The thumbnail images and the full images may be requested and/or received from the detector device 1 in sequence. An intermediate resolution for the current event may be made after each received thumbnail image, or after receiving all thumbnail images, and/or after each received full image, or after receiving all full images in the current event. In the case the intermediate resolution is considered to be accurate enough for setting a final resolution in step 79, no further thumbnails or full images might be needed. The smaller number of images is transferred for reaching a resolution for an event, the less energy and battery capacity is consumed for the transmission. On the other hand, the higher number of images is available, the easier it is to extract useful and accurate information from the images for an accurate resolution. Still further, thumbnails are smaller in a data file size (in amount of data) than full images, and therefore the transmission of thumbnails only conserve the battery of the wireless detector device 1. On the other hand, the thumbnails contain less visual information for giving a resolution of the current event, and they may give an incorrect resolution in some more difficult cases. The full images are larger in data file size and consume more battery capacity in transmission, but they also contain more visual information and should give a more accurate resolution result.

In an embodiment, the back-end network entity or server may have stored all the previous raw samples of previous events and may have coupled the previous events with resolutions. In an embodiment, upon receiving a new raw sample set the analysis 78 and 79 may look for similarities in the new samples to the previous samples of past confirmed and unconfirmed events, and use a found similarities to assist in classifying the new event as a false alarm or a true alarm. In an embodiment, a trained machine learning model may be used to detect patterns in raw sensor samples and give accurate results.

Figure 8:
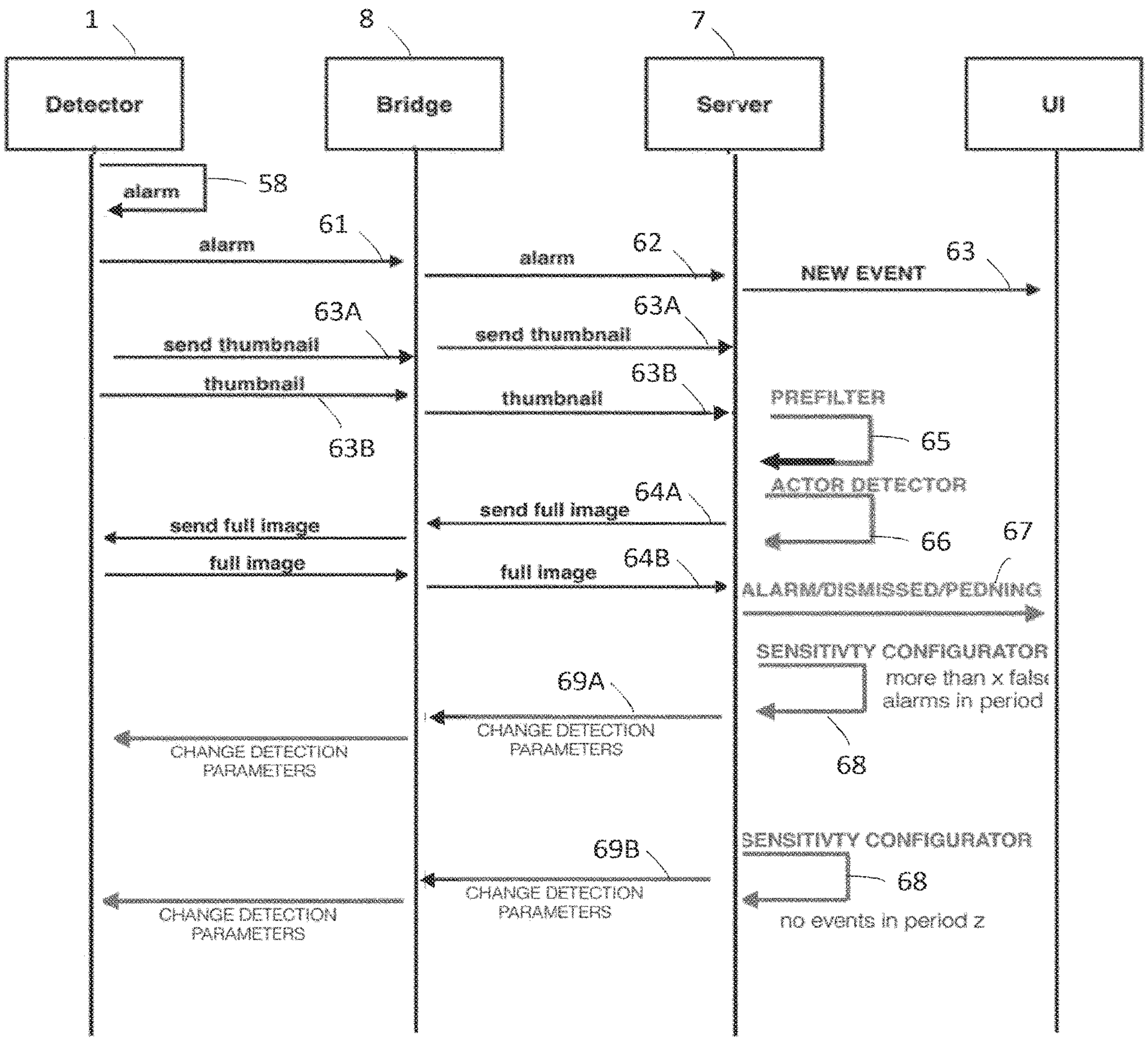
FIG. 8 shows a simplified schematic signalling diagram that illustrates another exemplary signalling and processing of an alarm.

According to another aspect of the invention, a prefiltering 65 of the events may be based on the set of thumbnails to detect and reject events with images where there is no (meaningful) change, i.e. false alarms. In that case, the back-end network entity or server 7 may not receive hashes with the alarm notification 61 but may receive 63B or request 63A one or more thumbnails for prefiltering 65. FIG. 8 shows a simplified schematic signalling diagram that illustrates exemplary signalling and processing of an alarm according the other aspect of the invention. Upon classifying an event as a false alarm, the further prosecution of the event may be stopped. Upon classifying an event as a true alarm, the more detailed analysis of the event may continue as in the further analysis or Actor Detector 66 in FIG. 6, except that requesting thumbnails can be omitted. The already received set of thumbnails may be subjected to further analysis, and a set of full images may be requested from the detector device 1 for further analysis.

Figure 9:
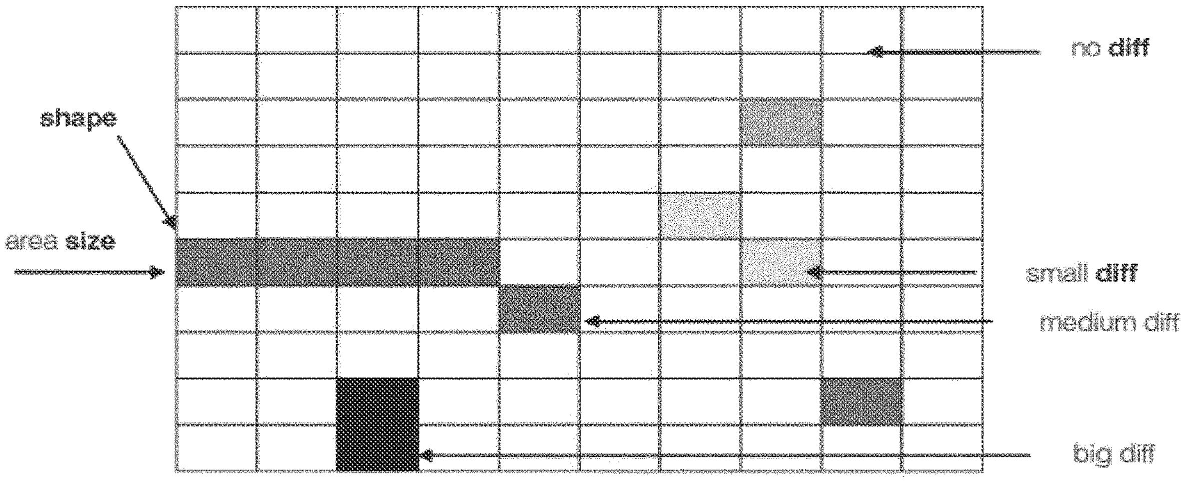
FIG. 9 illustrates schematically an exemplary matrix of structural similarity indexes in a prefilter process based on thumbnails according to an embodiment.

In an embodiment according to the other aspect, a structural similarity index may be associated with a thumbnail and a previous thumbnail, and a predetermined structural features may be associated with the similarity index. FIG. 9 illustrates a matrix of structural similarity indexes calculated over n thumbnails. The thumbnail images may be subdivided into a number of subblocks with a preset or configurable grid size. Each cell in the matrix represents a subblock in the original image. In an embodiment, the similarity indexes may be hashes that are calculated by a hash function, for example as described above for a false alarm test in the detector device 1. If the structural similarity indexes suggest a considerable movement of an object over the compared images, the event may be classified as a true alarm in the prefiltering 65. If the similarity indexes suggest that there is no meaningful movement over the compared images, the event may be classified as a false alarm in the prefiltering. Further structural parameters, such as one or more of shape, size, orientation, speed, location, etc., of an interesting object may be taken into account when considering whether there is a meaningful change or movement. For example, a structural index pattern with a predetermined parameters (e.g. size, shape) may suggest a human object, while a structural index pattern with another set of predetermined parameters may suggest a vehicle object, etc. An exemplary similarity index matrix is schematically illustrated in FIG. 9. In the FIG. 9, a grey scale of the sublocks or cells may represent a degree of the similarity: white colour represents "no difference", light grey colour represents "small difference", dark grey colour represents "medium difference", and black colour represents "big difference" between the corresponding subblocks of the compared images. Neighbouring subblocks with grey or black colour may form a larger continuous pattern which facilitates to detect a true alarm. The larger pattern may also have a shape and/or size which is characteristic to an interesting object, such as human or vehicle, which may further verify that the current event is a true alarm. Upon classifying an event as a false alarm, the further prosecution of the event may be stopped. Upon classifying an event as a true alarm, the more detailed analysis of the event may continue as illustrated in section 66 in FIG. 7, except that steps 76A and 76B for obtaining thumbnails can be omitted. The already received set of thumbnails may be subjected to further analysis in step 78, and a set of full images may be requested (steps 77A and 77B) from the detector device 1 for further analysis in FIG. 7.

The actor detector 66, or steps 78 and 79 in the example illustrated in FIG. 7, may be any type of a more detailed analysis of the event for detecting change in an image and for classifying objects from the information in the image. The classification may be based on size, position and/or confidence of an object, and an object may be classified into object classes, such as human, car, truck, tree, bush, etc. Some object classes may be marked as "interesting", e.g. humans, vehicles, animals. The "interesting" object classes may be used for positive detection and marking events as true alarms. For example, if an object of the interesting object class moves in the image. Other object classes like trees and bushes may be used as reference points and background detection. All object classes may be robustly described with physical features, such as an average size, an average width and/or an average height of the object. By knowing average sizes of every found and classified object in the image, every detected object may be given a probable distance from the digital camera and all the distances may be correlated with each other by taking into account the vertical position in the image. For example, if a tree and a person are in the same vertical position in the image, it is possible to calculate the probable distance of the person by using the known average dimensions of people and trees. An output from the actor detector may be an alarm with classification of objects, or notification that the event is false alarm, or some other notification 67 that may be useful.

In an embodiment, a further analysis of the set of thumbnails and the set of full images, such as steps 78 and 79 in FIG. 7, may comprise a movement filter. In an embodiment, the movement filter may be based on structural features and an optical flow over current and chosen previous images. The movement filter may use visual information in the images and compare them to discover considerable movement in large areas. The visual information or structural features may include SURF (Speeded Up Robust Features) features, such as isolated points, lines, edges, corners, or other regions of high variance. Optical flow is a pattern of an apparent motion of image objects between two consecutive images caused by the movement of an object, or more generally the optical flow is the apparent motion of brightness patterns in the image. In an embodiment, inputs to the motion filter may include a current image, and one or more previous images as a reference. SURF features or other structural features may be calculated for all the input images over a preset or configurable grid size. Then feature distances may be calculated for the current image against all the previous images inputted as a reference. The calculated feature distances may be aggregated into scores for every described point, i.e. every subblock or grid cell. This will give a one dimensional score for every subblock in the current image. If a score is below (or above) a dynamic or preconfigured threshold then the described area or subblock may be marked as "possible movement". Then Optical Flow maps may be calculated between the current image and all given previous images. Optical flow map may contain an Optical Flow Field for each described area or subblock. An optical flow field is a projection of onto the 2-dimensional digital image. The maps are aggregated into a single optical flow map. The aggregated optical flow map is overlaid onto the descriptor map. Any area that wasn't possible movement gets assigned as "possible movement". Any area that already was "possibly movement" gets marked as "movement". By combining these two methods the result is very accurate. If large consecutive areas are marked as a "movement" then a resolution of true-alarm is given, else false-alarm is given. Optical flows also allow it to calculate possible movement direction of the object.

According to an aspect of the invention, a back-end server or network entity 7 may be provided with a sensitivity configurator, as illustrated generally by a Sensitivity Configurator 68 in FIGS. 6 and 8, which may utilize results from the prefiltering or actor detector to configure the sensitivity of wireless detector devices for better detection in following triggers. In an embodiment, a detection sensitivity of the intrusion detector device may be configured less sensitive, if the number x of false alarms in a predetermined period of time y exceeds a preset threshold, for example by sending a Change detection parameters message as illustrated by message 69A in FIGS. 6 and 8. In another embodiment, a detection sensitivity of the intrusion detector device may be configured less sensitive, if percentage of false alarms of total number of alarms exceeds a preset threshold. In a further embodiment, a detection sensitivity of the intrusion detector device may be configured more sensitive, if no new events is received in a predetermined period, as illustrated by a message 69B in FIGS. 6 and 8. The intrusion detector device 1 may reconfigure the detection sensitivity according to sensitivity parameters received from the intrusion detection network entity or server 7. Examples of possible sensitivity parameters may include an amplification of an analog sensor signal, a predetermined (configurable) criterion for detecting motion in a motion sensor and a criterion for detecting high-variation hotspots in an aggregated distance matrix, etc.

Various technical means can be used for implementing functionality of a corresponding apparatus, such as detector device or a network entity or a server, described with embodiments and it may comprise separate means for each separate function, or means may be configured to perform two or more functions. Present apparatuses comprise processors and memory that can be utilized in an embodiment. For example, functionality of an apparatus according to an embodiment may be implemented as a software application, or a module, or a unit configured as arithmetic operation, or as a program (including an added or updated software routine), executed by an operation processor. Programs, also called program products, including software routines, applets and macros, can be stored in any apparatus-readable data storage medium and they include program instructions to perform particular tasks. All modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a detector device or a back-end server or corresponding components and/or other corresponding devices or apparatuses described with an embodiment may be configured as a computer or a microprocessor, such as single-chip computer element, including at least a memory for providing storage area used for arithmetic operation and an operation processor for executing the arithmetic operation. An example of the operation processor includes a central processing unit. The memory may be removable memory detachably connected to the apparatus.

For example, an apparatus according to an embodiment may be implemented in hardware (one or more apparatuses), firmware (one or more apparatuses), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

It will be obvious to a person skilled in the art that, the invention and its disclosed embodiments are not limited to the example embodiments disclosed above but the inventive concept can be implemented in various ways and modified and varied within the spirit and scope of the appended claims.

What is claimed is:

1. An intrusion detection method, the method comprising monitoring a monitored area by an autonomous wireless intrusion detector having at least one motion sensor, at least one digital camera, a processor, a wireless communications interface, and an autonomous power source, detecting, by the processor, a new alarm event in response to the at least one motion sensor detecting a potential movement within the monitored area, triggering, by the processor, the at least one digital camera in the autonomous wireless intrusion detector to create at least one set of consecutive digital images of the monitored area in response to the detecting of the new alarm event, analyzing, by the processor, the at least one set of digital images created for the new alarm event to perform a false alarm test for the new alarm event, the false alarm test requiring that the at least one set of digital images meets a predetermined criterion, wirelessly sending the new alarm event and at least one digital image of the at least one set of digital images of the new alarm event to an intrusion detection network backend server for a false-true alarm detection only if the predetermined criterion is met and the new alarm event passes the false alarm test according to the analysis, dynamically adjusting, by the processor, an intrusion detection sensitivity of the autonomous wireless intrusion detector according to sensitivity control information wirelessly received from the intrusion detection network backend server, the sensitivity control information being dependent on a result of a false/true alarm classification carried out in the intrusion detection network backend server, wherein the dynamically adjusting an intrusion detection sensitivity of the autonomous wireless intrusion detector device includes adjusting said predetermined criterion.

2. The method as claimed in claim 1, wherein the detecting comprises:

measuring one or more statistical parameters of at least one sensor signal received from the at least one motion sensor, comparing the one or more measured statistical parameters to current or historical parameter values, and detecting the new alarm event based on the at least one sensor signal if the comparison meets a second predetermined criterion, and wherein the dynamically adjusting of the intrusion detection sensitivity of the autonomous wireless intrusion detector comprises adjusting said second predetermined criterion used in the comparison according to the sensitivity control information received from the intrusion detection network backend server.

3. The method as claimed in claim 1, wherein the detecting of the new event comprises receiving at least one analog sensor signal from the at least one motion sensor, and wherein the dynamically adjusting comprises dynamically adjusting a level of the at least one analog signal according to the sensitivity control information received from the intrusion detection network backend server.

4. The method as claimed in claim 1, wherein the at least one motion sensor comprises at least one passive infrared sensor.

5. An intrusion detection method in an intrusion detection network backend server, the method comprising:

receiving, by the intrusion detection network backend server, new alarm events with associated digital images sent by an autonomous wireless intrusion detection device having a dynamically controllable intrusion detection sensitivity, the dynamically controllable intrusion detection sensitivity including a predetermined criterion of a false alarm test performed in the autonomous wireless intrusion detection device on digital images of a new alarm event, analyzing, by the intrusion detection network backend server, at least one digital image associated with each received new alarm event to classify the new alarm event as a true event or a false event, and dynamically controlling, by the intrusion detection network backend server, the autonomous wireless intrusion detection device to change the intrusion detection sensitivity of the autonomous wireless intrusion detection device by sending sensitivity control information dependent on the result of the false-true classification of the received alarm events, wherein the intrusion detection sensitivity of the autonomous wireless intrusion detection device includes said predetermined criterion used in the false alarm test performed in the autonomous wireless intrusion detection device.

6. The method as claimed in claim 5, further comprising dynamically controlling the autonomous wireless intrusion detection device to decrease the intrusion detection sensitivity of the autonomous wireless intrusion detection device based on a count of false alarms.

7. The method as claimed in claim 5, further comprising controlling the autonomous wireless intrusion detection device to reduce the intrusion detection sensitivity, if the count of received false alarm events exceeds a predetermined threshold in a predetermined period of time.

8. The method as claimed in claim 5, further comprising controlling the autonomous wireless intrusion detection device to reduce the intrusion detection sensitivity, if a percentage of false alarm events of total number of alarm events exceeds a predetermined threshold percentage.

9. The method as claimed in claim 5, further comprising controlling the autonomous wireless intrusion detection device to increase the intrusion detection sensitivity if a predetermined time has passed from the last received event.

10. An autonomous wireless intrusion detection device, comprising:

a wireless communications interface, at least one motion sensor configured to detect motion in a monitored area, at least one digital camera configured to create digital images of the monitored area, an autonomous power supply, and a processor configured to control the autonomous wireless intrusion detection device to perform routines comprising:

detecting a new alarm event in response to the at least one motion sensor detecting a potential movement within the monitored area, triggering the at least one digital camera in the autonomous wireless intrusion detection device to create at least one set of consecutive digital images of the monitored area in response to detecting the new alarm event, analyzing the at least one set of digital images created for the new alarm event to perform a false alarm test for the new alarm event, the false alarm test requiring that the at least one set of digital images meets a predetermined criterion, wirelessly sending the new alarm event and at least one digital image of the at least one set of digital images of the new alarm event to an intrusion detection network backend server for a false-true alarm detection only if the predetermined criterion is met and the new alarm event passes the false alarm test according to the analysis, and dynamically adjusting an intrusion detection sensitivity of the autonomous wireless intrusion detection device according to sensitivity control information wirelessly received from the intrusion detection network backend server, the sensitivity control information being dependent on a result of a false/true alarm classification carried out in the intrusion detection network backend server, wherein the dynamically adjusting an intrusion detection sensitivity of the autonomous wireless intrusion detection device includes adjusting said predetermined criterion.

11. An intrusion detection network backend server, comprising:

a processor and a communication interface, the processor being configured to control the intrusion detection network backend server to perform routines comprising:

receiving new alarm events with associated digital images sent by an autonomous wireless intrusion detection device having a dynamically controllable intrusion detection sensitivity, the dynamically controllable intrusion detection sensitivity including a predetermined criterion of a false alarm test performed in the autonomous wireless intrusion detection device on digital images of a new alarm event, analyzing at least one digital image associated with each received new alarm event to classify the new alarm event as a true event or a false event, and dynamically controlling the autonomous wireless intrusion detection device to change the intrusion detection sensitivity of the autonomous wireless intrusion detection device by sending sensitivity control information dependent on the result of the false-true classification of the received alarm events, wherein the intrusion detection sensitivity of the autonomous wireless intrusion detection device includes said predetermined criterion used in the false alarm test performed in the autonomous wireless intrusion detection device.

12. The device as claimed in claim 10, wherein the detecting comprises:

measuring one or more statistical parameters of at least one sensor signal received from the at least one motion sensor, comparing the one or more measured statistical parameters to current or historical parameter values, and detecting the new alarm event based on the at least one sensor signal if the comparison meets a second predetermined criterion, and wherein the dynamically adjusting of the intrusion detection sensitivity of the autonomous wireless intrusion detection device comprises adjusting said second predetermined criterion according to the sensitivity control information received from the intrusion detection network backend server.

13. The device as claimed in claim 10, wherein the detecting of the new event comprises receiving at least one analog sensor signal from the at least one motion sensor, and wherein the dynamically adjusting comprises dynamically adjusting a level of the at least one analog signal according to the sensitivity control information received from the intrusion detection network backend server.

14. The device as claimed in claim 10, wherein the at least one motion sensor comprises at least one passive infrared sensor.

15. The intrusion detection network backend server as claimed in claim 11, wherein the processor is configured to control the intrusion detection network backend server to perform routines further comprising dynamically controlling the autonomous wireless intrusion detection device to decrease the intrusion detection sensitivity of the autonomous wireless intrusion detection device based on a count of false alarms.

16. The intrusion detection network backend server as claimed in claim 11, wherein the processor is configured to control the intrusion detection network backend server to perform routines further comprising controlling the autonomous wireless intrusion detection device to reduce the intrusion detection sensitivity, if the count of received false alarm events exceeds a predetermined threshold in a predetermined period of time.

17. The intrusion detection network backend server as claimed in claim 11, wherein the processor is configured to control the intrusion detection network backend server to perform routines further comprising controlling the autonomous wireless intrusion detection device to reduce the intrusion detection sensitivity, if a percentage of false alarm events of total number of alarm events exceeds a predetermined threshold percentage.

18. The intrusion detection network backend server as claimed in claim 11, wherein the processor is configured to control the intrusion detection network backend server to perform routines further comprising controlling the autonomous wireless intrusion detection device to increase the intrusion detection sensitivity if a predetermined time has passed from the last received event.

* * * * *